United States Patent Office 3,493,524
Patented Feb. 3, 1970

3,493,524
AZINE POLYMERS AND PROCESS FOR
PREPARING THE SAME
James E. Webb, Administrator of the National Aeronautics and Space Administration, with respect to an invention of Gaetano F. D'Alelio, Notre Dame, Ind.
No Drawing. Filed Nov. 9, 1966, Ser. No. 593,605
Int. Cl. C08g 33/02, 53/08
U.S. Cl. 260—2.5
20 Claims

ABSTRACT OF THE DISCLOSURE

Azine polymers having the formula

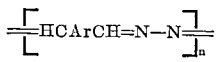

where $n$ is at least 5 and Ar is an arylene moiety are prepared in fusible, tractable form by reacting an azine having the formula RCH=N—N=CHR where R is an aryl moiety with an aromatic aldehyde having the formula OHCArCHO where Ar is an arylene moiety or a Schiff base having the formula RN=CHArCH=NR where Ar is an arylene moiety and R is an aryl moiety. The reaction is carried out by heating a mixture of the reactants to a temperature of 200 to 260° C. under an inert atmosphere. Further heating of the fusible polymer to 280 to 450° C. converts it to an infusible material having a high degree of thermal stability.

---

The invention described herein was made in the performance of work under a NASA grant and is subject to the provisions of Section 305 of the National Aeronautics and Space Act of 1958, Public Law 85–568 (72 Stat. 435; 42 U.S.C. 2457).

This invention relates to polymeric azines and to processes for preparing the same.

Polymeric azines having the general formula

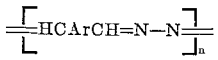

where Ar is an arylene moiety have been prepared previously by solution processes, for example, by reaction of an aromatic dialdehyde with hydrazine in benzene or alcohol. The product has been an intractable, yellow "brick dust" material insoluble in most solvents, infusible and not amenable to further fabrication or shaping. The previously known polymer had a low molecular weight, approximately that of a dimer, polymerization having been terminated spontaneously and uncontrollably by precipitation in the solvent before extensive chain growth could occur.

It is desired to provide these azine polymers in a tractable, fusible, higher-molecular-weight form suitable for fabrication into useful products. Though the chemical structure of these polymers suggests that they would be a suitable material for heat shielding applications, previous workers have shown that azine monomers undergo thermal decomposition, releasing gaseous nitrogen and leaving an organic residue. For example, dibenzalazine decomposes to produce gaseous nitrogen and stilbene. This decomposition mechanism would mitigate against considering these materials for heat-shielding applications. However, if tractable polymers of high enough molecular weight could be prepared, and if they could be decomposed to yield nitrogen gas and a stable polymer residue, the mechanism would provide the basis for a highly effective ablator.

Ablative heat shields are used to provide thermal protection for space vehicles or other bodies intended to reenter the earth's atmosphere. The heat shield, normally a composite of a polymeric resin and reinforcing fibers of a material such as silica, cellulose, metallic fibers, fiber glass, etc., dissipates the extreme heat of re-entry by various mechanisms while undergoing thermal decomposition. Previously used polymeric resins, normally phenolic or epoxy resins, present a disadvantage in that their decomposition products include a large proportion of combustible hydrogen and carbon-containing gases, which react exothermically with atmospheric oxygen. The efficiency of ablative heat shields would be improved substantially by using a polymer which releases only inert gaseous nitrogen during decomposition. A high degree of thermal stability in the residue remaining after release of nitrogen would enhance the structural integrity of the heat-shielding layer and thus provide an additional advantage.

It is therefore a primary object of this invention to provide polymeric azines in the form of tractable, fusible material amenable to fabrication.

Another major object is to provide a polymeric material which produces gaseous nitrogen and a stable polymeric residue upon being subjected to thermal decomposition.

Another related object is to provide a process for synthesizing polymeric azines.

Still another important object is to provide a process for preparing highly stable polystilbene-type polymers.

Other objects and advantages of the invention will be apparent from the following description.

In the present invention polymeric azines having the formula

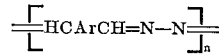

where Ar is an arylene moiety and $n$ is at least 5 are prepared in a fusible, tractable form amenable to fabrication. These polymers are an ideal ablative material; they decompose at about 30°–400° C. depending upon the composition of the polymer to produce a gaseous nitrogen and a residual polystilbene having excellent thermal stability.

Polymeric azines of the formula given above are prepared by reacting an azine with an aromatic dialdehyde or a Schiff base having a difunctional aldehyde moiety in a melt system. Solution polymerization, as has been employed by previous workers, produces only the low-molecular-weight "brick dust" polymer. The reactions using the aldehyde and Schiff base, respectively, are described below under the headings "Carbonyl Exchange" and "Schiff-base Exchange."

Carbonyl exchange

In the carbonyl exchange embodiment the aromatic dialdehyde and azine undergo an exchange reaction, represented by the following equation:

$n$OHCArCHO + $n$RCH=N—N=CHR ⟶

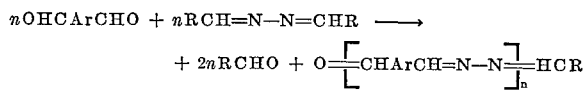

The by-product aldehyde is removed from the reaction mixture by volatilization at melt temperatures, allowing the polymerization to proceed to a high molecular weight.

The azine reactant in this embodiment is represented by the formula $$RCH=N-N=HCR$$

where R is an aryl radical. Illustrative examples of aryl radicals included are $C_6H_5$, $CH_3C_6H_4$, $(CH_3)_2C_6H_3$, $(CH_3)_3C_6H_2$, $C_6H_5C_6H_4$, $C_6H_5OC_6H_4$, $C_6H_5SC_6H_4$, $CH_3OC_6H_4$, etc. Specifice azine reactants which can be used include, but are not limited to, dibenzalazine, di-(methoxybenzal)azine, ditolylazine, di-(hydroxylbenzal) azine, etc. Dibenzalazine, which is readily prepared by reaction of benzaldehyde with hydrazine, is preferred, primarily for economic reasons.

The aldehyde reactant is represented by the formula $$OHCArCHO$$

where Ar is a divalent arylene moiety. The arylene moiety can be a single phenylene structure such as m-phenylene, p-phenylene or a phenylene ring having one or two hydrogen atoms substituted by methyl groups; a diphenyl group; or a group consisting of two phenylene rings linked by one or more hetero atoms or groups such as O, S, $SO_2$, C=O, NH, N—$CH_3$, $CH_2$, $C_2H_2$, or $CH_2$ and $SO_2$. The phenylene rings can also have one to two hydrogen atoms substituted with radicals such as OH, $CH_3O$, $CH_3$, $C_6H_5$, $C_6H_5O$, and F. Aliphatic chain linkages containing more than one methylene group are excluded from the groups between phenylene rings since the conjugated structure of the polymer backbone, which is critical to a high degree of thermal stability in the product, would not be attained. In the latter groups the linkages can be in the meta-meta, para-para, or para-meta positions. Illustrative examples of specific aldehydes included are terephthaldehyde, m-phthaldehyde, 5,5'-methylene disalicyaldehyde, 5,5'-methylene dimethoxy-disalicyaldehyde and the p,p'; p,m'; and m,m' forms of diformyldiphenyl methane, diformyldiphenyl oxide, diformyldiphenyl sulfide, diformyldiphenyl sulfone, diformyldiphenyl ketone, diformyldiphenyl amine, diformyldiphenyl ethylene, diformyldiphenyl acetylene, etc.

Polymerization is initiated by heating a mixture of the azine and dialdehyde under an inert atmosphere to form a molten homogeneous solution. The azine and dialdehyde reactants are preferably provided at stoichiometric proportions in accordance with the equation given above. The onset of polymerization is indicated by formation of a bright yellow solution, and further polymerization through increasing stages of molecular weight at higher temperatures is indicated by vivid changes in color from yellow to orange to red to brown and to black. The mixture may be heated rapidly to 250° C., but preferably is heated slowly, for example, at a temperature increase rate of 10° to 30° C. per hour, up to 250° to 260° C. The by-product aldehyde is evolved, beginning at about 225° C. In order to ensure a high molecular weight it is preferred to maintain the mixture at 200° to 260° C. for 2 to 24 hours. Unless the final polymer is desired directly, higher temperatures are to be avoided since the polymer would become infusible and intractable. The fusible, black polymer, in the form of a glassy, coherent mass is then recovered and ground into small fragments or powder for further processing to be described below.

The carbonyl exchange polymerization reaction can also be carried out in the presence of a monofunctional Schiff base which serves both as a solvent and a moderator for control of the reaction. Isolation of a fusible, tractable intermediate is facilitated by this means. In addition this material enters into the polymerization reaction to a limited extent, as evidenced by yields in excess of 100%. The monofunctional Schiff base in this embodiment is represented by the formula $$RCH=NR$$

where R is an aryl moiety. Illustrative examples of aryl moieties included are $C_6H_5$, $CH_3C_6H_4$, $(CH_3)_2C_6H_3$, $(CH_3)_3C_6H_2$, $C_6H_5C_6H_4$, $C_6H_5OC_6H_4$, $C_6H_5SC_6H_4$, and $CH_3OC_6H_4$. Benzylideneaniline, $C_6H_5CH=NC_6H_5$, is preferred. The monofunctional Schiff base is provided at a proportion at least equivalent to the weight of the product, but the proportion is not critical. Higher proportions may result in earlier termination of the polymer growth reaction, in which case a portion of the excess can be removed by distillation at low temperatures and at reduced pressure, for example, at a temperature of 100° to 250° C. at 5 to 150 mm. Hg pressure, and thereafter the polymerization can be continued if desired.

In order to avoid oxidation and side reactions, the polymerization reaction is preferably carried out in the absence of moisture and oxygen. An atmosphere of an inert gas such as nitrogen, helium or argon provided over the reaction mixture is suitable for this purpose. For this reason and to provide for removal of the by-product aldehyde and any monofunctional Schiff base, the reaction is carried out in apparatus provided with distilling equipment and an inert gas inlet. Pressure of the gas over the reaction mixture is not critical, but a relatively high pressure of 50 to 760 mm. Hg is desirable in the early part of the reaction and substantially reduced pressure, for example, down to 1 to 0.01 mm. Hg or less is preferred in the later heating stages to enhance removal of volatized materials.

Bis exchange

In the bis-exchange embodiment a Schiff base having a difunctional aldehyde moiety is reacted with an azine of the formula given above. This reaction is represented by the following equation:

$$nRCH=N-N=CHR + nRN=CHArCH=NR \longrightarrow$$

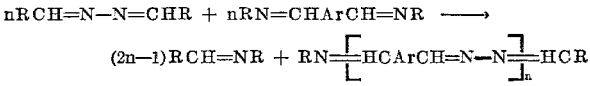

The by-product is a monofunctional Schiff base, the same type of compound which is used as reaction medium and solvent in the alternative embodiment described for the carbonyl exchange reaction. The bis exchange reaction proceeds more slowly than the carbonyl exchange, and it is the most effective with regard to control over polymer synthesis properties. This reaction can be interrupted at an intermediate point to obtain a polymer with predetermined characteristics such as fusibility and a molecular weight falling within a predetermined range.

The difunctional Schiff-base reactant is represented by the formula $$RN=CHArCH=NR$$

where Ar is an arylene moiety and R is an aryl moiety. Ar can be any of the moieties given for Ar in the aldehyde reactant in the carbonyl-exchange reaction and R can be any of the aryl moieties given above for R in the monofunctional Schiff base formula. Illustrative examples of specific Schiff bases included are p-xylylidenedianiline, m-xylylidenedianiline, di(p,p'-diformyldiphenylmethane)-aniline, di(p,p'-diformyldiphenyloxide)-aniline, di(p,p'-diformyldiphenylsulfide)-aniline, di(p,p'-diformyldiphenylsulfone) - aniline, di(p,p' - diformyldiphenylketone)-aniline, di(p,p'-diformyldiphenylethylene)-aniline, di(p,p'-diformyldiphenylacetylene)-aniline, etc.

The bis-exchange reaction is carried out by a procedure substantially the same as described above for the carbonyl exchange. A mixture of the reactants is heated under an inert atmosphere and held at elevated temperature until a black polymer product is obtained. A temperature of 200° to 350° C. for a period of 1 to 48 hours is suitable for this purpose. The by-product monofunctional Schiff base is then removed by distillation, and the product is ground or crushed for further processing.

The fusible product polymer can be fabricated into useful forms by compressing the finely divided polymer into the desired shape in a suitable mold and heating under an inert atmosphere over a wide range of temperatures and pressures depending on whether a formed polyazine, a polystilbene or a polymer which contains both azine and stilbene moieties in the chain is desired. Atmosphere pressure can be used, but pressures from 100 to 20,000 pounds per square inch, or even higher when the polymer is admixed with an inorganic filler, are preferred to obtain maximum consolidation. A temperature from 200° to 600° C. can be used, the higher temperatures within this range resulting in more complete conversion to polystilbene. For most purposes a temperature of 280° to 450° C. is satisfactory. Heating at this temperature for a period of 5 to 20 minutes is required generally, although longer times are necessary for massive structures. Any remaining amounts of reactant monomers or monofunctional Schiff base are evolved during this treatment. The polymer is converted to rigid, infusible form with good mechanical properties by further solid-state polymerization in this step. This reaction can be accelerated by uniformly mixing a small amount, for example, 0.5 to 1 weight percent, of a Lewis acid catalyst with the polymer before molding. Examples of Lewis acids which can be used include zinc chloride, aluminum chloride, boron trifluoride, titanium tetrachloride, zirconium tetrachloride, mercuric bromide, cobalt iodide, nickel sulfate, cadmium nitrate, cadmium perchlorate, silicon tetrachloride, arsenic tribromide, antimony pentabromide, bismuth trichloride, tin tetrachloride, trimethylamine hydrochloride, trimethylamine hydrobromide, phosphoric acid, tributylphosphonium chloride, and p-toluenesulfonic acid.

For the fabrication of composite heat shields the fusible polymer is intermingled with the other components of the composite, for example, reinforcing fibers of a refractory material such as fiber glass, silica or boron, etc., or with materials such as cellulose, acrylic fibers, polybenzylimidazole, etc., which carbonize under the influence of heat, prior to the final heat treatment.

Polystilbene preparation

The polymeric azines described above can be converted to polystilbene-type polymer having outstanding thermal stability by heating the polyazine in an inert atmosphere to a temperature of at least 280° to 300° C. for extended periods of time and preferably 350° to 500° C. for shorter periods of time. Formation of the polystilbene is represented by the following equation:

The high degree of thermal stability of the resulting polymer is believed to result from its conjugated structure. During the conversion process, the polymer consists of segments of polyazine polystilbene.

The polystilbene product is infusible and highly intractable so that fabrication of the desired shape or structure is carried out by shaping the precursor azine prior to conversion to polystilbene. The product polystilbene polymers are stable in nitrogen or other inert atmosphere up to about 1200° C., and, after being heat-treated in nitrogen at 1176° C., they are stable in air to a temperature of 590° to 650° C.; in contrast, the polymeric Schiff bases are stable in air to a maximum temperature of 600° C. In view of this outstanding thermal stability the stilbene polymers are useful for numerous applications involving high-temperature conditions. For example, they can be used not only as heat shields but also for moderators for nuclear reactors, nozzles for rocket engines, and high temperature semiconductors. By selecting appropriate time and temperature schedules the polyazines can be converted partially or completely to polystilbene type polymers in the form of foams; the released nitrogen acting as the blowing agent. Foams are produced by rapidly heating to at least 400° C.

This invention is further illustrated by the following examples. The parts and percentages given are by weight unless otherwise indicated.

EXAMPLE I

A mixture of 0.4565 part terephthaldehyde and 0.7120 part dibenzalazine is ground together in a mortar, placed in a microflask provided with a nitrogen inlet and heated under a nitrogen atmosphere. The temperature is raised gradually to 270° C. during which time the color of the melt changes from yellow to orange to red to reddish black. A vigorous bubbling and foaming occurs at about 260° C., benzaldehyde being evolved. The mixture is held at 270° C. for 5 hours and is then cooled. A black-brown solid is obtained at a yield of 0.63 part.

EXAMPLE II

A mixture of 0.5417 part terephthaldehyde and 0.8403 part dibenzalazine is placed in the apparatus of Example I, heated under a nitrogen atmosphere to 205° C. and held at 205° C. for 5 hours at atmospheric pressure. The temperature is then increased to 230° C. for 8 hours, after which the pressure is reduced to 2 mm. Hg and the mixture held under these conditions for 24 hours. The mixture is then cooled, and 0.56 part of a brownish-black shiny polymer is recovered. Upon being held under a Bunsen flame for a short period the polymer is converted to a thermally stable, black stilbene polymer.

EXAMPLE III

A mixture of 0.9804 part p-xylylidenedianiline and 0.7188 part dibenzalazine is placed in a microflask and heated under a nitrogen atmosphere. The mixture is heated to 210° C. for 4 hours and to 225° C. for 43 hours. The melt changes in color from yellow to red to black. A black, glassy polymer is recovered at a yield of 0.65 part. Rapid heating of the polymer at 400° to 500° C. produced a foamed, infusible structure.

EXAMPLE IV

A mixture of 0.9740 part p-xylylidenedianiline and 0.7696 part dibenzalazine is heated in a microflask under a nitrogen atmosphere. The temperature is raised to 225° C. and held for 12 hours. The pressure is then reduced to 2 mm. Hg. After 24 hours the evolution of volatile products ceases and the reaction is terminated. A black, shiny polymer is recovered at a yield of 0.61 part.

EXAMPLE V

A mixture of 1.0511 parts methylene disalicylaldehyde-dianiline and 0.8528 part dibenzalazine is placed in a microflask and heated under a nitrogen atmosphere. The temperature is raised slowly to 190° C., and the mixture forms a yellow-orange melt. The melt gradually changes to dark-orange, red, reddish brown, brown and dark brown. The mixture becomes highly viscous, and the pressure is reduced to 15 mm. Hg. After 3 hours the mixture is cooled, and 0.8262 part of glossy polymer is recovered.

EXAMPLE VI

A mixture of 1.0225 parts 5,5'-methylene dimethoxy disalicylaldehyde and 0.7489 part dibenzalazine is placed in a microflask and heated under a nitrogen atmosphere. The temperature is raised slowly to 180° C., and the mixture forms a melt which changes in color from amber to dark brown. The pressure is reduced to 10 mm. Hg, and the temperature is held at 175° C. for 10 hours. A dark brown glossy polymer is then recovered at a yield of 115% of theoretical.

EXAMPLE VII

Samples of polymers prepared as described in Examples IV, V, and VI above, are subjected to thermogravimetric analysis to determine the amount of weight loss at elevated temperatures. In each case the sample is heated at a rate of 15° C. per minute at a gas flow rate of one standard liter per minute. Two samples of the polymer of Example IV are used. One, designated "m" is employed as a solid chuck, and the other designated "p," is reduced to powder by grinding for 5 seconds in a stainless steel capsule. The cumulative percent weight losses of the polymers while being heated in nitrogen at temperatures up to 1176° C. are given in the following table:

WEIGHT LOSS OF POLYMERS WHILE BEING HEATED IN NITROGEN

| Example No. | Percent weight loss at ° C. | | | | | | | | | | |
|---|---|---|---|---|---|---|---|---|---|---|---|
| | 200 | 300 | 400 | 500 | 600 | 700 | 800 | 900 | 1,000 | 1,100 | 1,176 |
| IV (p) | 0.0 | 0.0 | 1.0 | 8.1 | 35.4 | 45.5 | 48.0 | 49.5 | 50.5 | 51.5 | 52.8 |
| IV (m) | 1.0 | 1.5 | 2.0 | 4.1 | 12.2 | 22.4 | 26.6 | 27.5 | 28.2 | 29.0 | 30.0 |
| V | 0.0 | 1.0 | 2.0 | 24.0 | 56.0 | 64.0 | 67.0 | 68.0 | 68.1 | 69.0 | 70.0 |
| VI | 0.0 | 0.8 | 1.5 | 12.0 | 31.0 | 41.0 | 44.5 | 45.7 | 41.0 | 46.5 | 47.0 |

The samples are then subjected to thermogravimetric analysis after being heated in nitrogen. The results obtained are given in the following table.

WEIGHT LOSS OF POLYMERS UPON BEING RECYCLED IN NITROGEN

| Example No. | Percent weight loss at ° C. | | | | | | | | | | |
|---|---|---|---|---|---|---|---|---|---|---|---|
| | 200 | 300 | 400 | 500 | 600 | 700 | 800 | 900 | 1,000 | 1,100 | 1,176 |
| IV (p) | 0 | 0 | 0 | 0 | 0 | 1.0 | 1.0 | 1.0 | 2.0 | 2.0 | 2.0 |
| IV (m) | 0 | 0 | 0 | 0 | 0 | 0 | 0 | 0 | 0 | 0 | 1.0 |
| V | 0 | 0 | 0 | 0 | 0 | 1.0 | 2.0 | 2.0 | 2.0 | 2.0 | 2.0 |
| VI | 0 | 0 | 0 | 0 | 0 | 0 | 1.0 | 1.0 | 1.0 | 1.0 | 1.0 |

The polymer samples are then subjected to thermogravimetric analysis in air. The results obtained are shown in the following table.

WEIGHT LOSS IN AIR OF POLYMERS HEATED IN NITROGEN

| Example No. | Percent weight loss at ° C. | | | | | | | | |
|---|---|---|---|---|---|---|---|---|---|
| | 200 | 300 | 400 | 500 | 600 | 700 | 800 | 900 | 1,000 |
| IV (p) | 0 | 0 | 0 | 0 | 1.0 | 18.2 | 70.1 | 100 | |
| IV (m) | 0 | 0 | 0 | 0 | 0 | 15.4 | 63.2 | 94.0 | 100 |
| V | 0 | 0 | 0 | 0 | 3.2 | 77.5 | 100 | | |
| VI | 0 | 0 | 0 | 1.8 | 13.0 | 100 | | | |

It may be seen from these tables that the polymers prepared by the present invention exhibit outstanding thermal stability in air after being heated in nitrogen.

The weight losses in nitrogen at temperatures up to about 600° C. are attributed to decomposition of the azine to stilbene and to release of nitrogen. At higher temperatures the weight loss is largely due to release of monomer, benzylideneaniline solvent or by-products; the yield of polymer in preparation having been more than 100% in most cases.

EXAMPLE VIII

A mixture of 0.9743 part p-xylylidenedianiline and 0.5693 part di-3-pentylideneazine is heated in a microflask under a nitrogen atmosphere. The temperature is raised to 225° C. and held for 12 hours. The pressure is then reduced to 2 mm. Hg. After 24 hours the evolution of volatile products ceases and the reaction is terminated. A black, shiny polymer is recovered at a yield of 0.57 part.

EXAMPLE IX

A mixture of 1.051 parts methylene disalicyaldehyde-dianiline and 0.4346 part di-3-pentylideneazine is placed in a microflask and heated under a nitrogen atmosphere. The temperature is raised slowly to 180° C., and the mixture forms a yellow-orange melt. The melt gradually changes to dark-orange, red, reddish brown, brown and dark drown. The mixture becomes a highly viscous, and the pressure is reduced to 20 mm. Hg. After 3 hours the mixture is cooled, and 0.8327 part of glossy polymer is recovered.

Solution polymerization of polymeric azines yields "brick dust" polymers in which the value of $n$ in the above formulas has an average of about 2. In contrast, the polymers prepared by melt techniques in the present invention have a value of $n$ that is at least 5 and up to about 12 or 13 before the product becomes insoluble in organic solvents. The value of $n$ increases to about 100 or more upon further heating, even in the solid state at temperatures below the temperature of decomposition to nitrogen and the polystilbene. The polystilbenes obtained upon heating the polyazines to temperatures over 300° C. have a value of $n$ approximately the same as that of the precursor polyazine.

The above examples are merely illustrative and are not to be understood as limiting the scope of the invention, which is limited only as indicated by the appended claims.

It will be apparent that various modifications in the procedures described above may be made within the spirit and scope of the invention.

What is claimed is:
1. A process for preparation of a polymer having repeating units of the formula

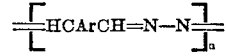

where Ar is an arylene moiety and $n$ is at least 5 which comprises heating a substantially equimolar mixture of an azine having the formula $$RCH=N-N=HCR$$

where R is an aryl moiety and an aldehyde having the formula OHCArCHO where Ar is an arylene moiety or a difunctional Schiff base having the formula $$R''N=CHArCH=NR''$$

where Ar is an arylene moiety and R'' is an aryl moiety under an inert atmosphere whereby a homogeneous melt is obtained and heating said melt under an inert atmosphere until a black polymer is formed.

2. The process of claim 1 wherein said azine is reacted with said aldehyde.

3. The process of claim 2 wherein said melt is held at a temperature of 200° to 260° C. for 2 to 24 hours.

4. The process of claim 3 wherein said azine is benzalazine.

5. The process of claim 4 wherein said aldehyde is terephthaldehyde.

6. The process of claim 2 wherein a monofunctional Schiff base having the formula $$RCH=NR$$

where R is an aryl moiety is provided in said mixture.

7. The process for preparation of a fusible polymer having repeating units of the formula

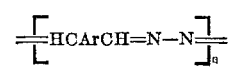

where Ar is an arylene moiety and $n$ is at least 5 which comprises heating under an inert atmosphere a substantially equimolar mixture of an aldehyde having the formula OHCArCHO where Ar is an arylene moiety and an azine of the formula $$RCH{=}N{-}N{=}CHR$$

where R is an aryl moiety to a temperature of 200° C. to 260° C. until a black polymer is formed and recovering said polymer.

8. The process of claim 1 wherein said azine is reacted with said difunctional Schiff base.

9. The process of claim 8 wherein said azine is dibenzalazine.

10. The process of claim 9 wherein said Schiff base is xylylidenedianiline.

11. The process of claim 8 wherein said mixture is held at a temperature of 200° to 350° C. for 1 to 48 hours.

12. The process for preparation of a fusible polymer having repeating units of the formula

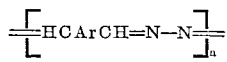

where Ar is an arylene moiety and $n$ is at least 5 which comprises heating under an inert atmosphere a substantially equimolar mixture of an azine having the formula $$RCH{=}N{-}N{=}CHR$$

where R is an aryl moiety and a difunctional Schiff base having the formula $$R'N{=}CHArCH{=}R'$$

where Ar is an arylene moiety and R' is an aryl moiety to a temperature of 200 to 350° C. until a black polymer is formed and recovering said polymer.

13. The process for fabricating an infusible shaped body from a fusible polymer having the formula

where Ar is an arylene moiety and $n$ is at least 5 which comprises compressing said polymer in finely divided form to produce a shaped body and heating said body to a temperature of 280° to 450° C. under an inert atmosphere.

14. The process of claim 13 wherein small amount of a Lewis acid catalyst is provided in said body.

15. The process for preparation of a thermally stable polymer which comprises heating a polyazine polymer having the formula

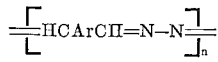

where Ar is an arylene moiety and $n$ is at least 5 to a temperature of 350° C. to 500° C. under an inert atmosphere until evolution of gaseous nitrogen therefrom is substantially completed.

16. A polymer having a multiplicity of the repeating units

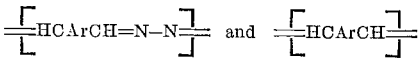

in its structure, wherein Ar is an arylene moiety.

17. A polymer of claim 16 in which Ar is $C_6H_4$.

18. The process of preparing the polymer of claim 16 which comprises heating the polymer of claim 15 to a temperature above 280° C. and below 1000° C. until nitrogen gas is eliminated.

19. The process of preparing a foamed polymer which comprises heating a polymer containing repeating units of the structure

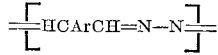

to at least 400° C.

20. The foamed polymer prepared by the process of claim 19.

References Cited

UNITED STATES PATENTS

| | | | |
|---|---|---|---|
| 3,110,687 | 11/1963 | Smith | 260—2 |
| 3,340,232 | 9/1967 | Smith et al. | 260—48 |
| 3,124,559 | 3/1964 | De Witt | 260—72 |
| 3,198,767 | 8/1965 | Motsuda et al. | 260—67 XR |
| 3,418,281 | 12/1968 | Smith et al. | 260—72.5 |

MURRAY TILLMAN, Primary Examiner

K. E. KUFFNER, Assistant Examiner

U.S. Cl. X.R.

260—67, 72.5